US008254893B2

(12) United States Patent
Ratnakar

(10) Patent No.: US 8,254,893 B2
(45) Date of Patent: *Aug. 28, 2012

(54) SYSTEM AND METHOD FOR AUTOMATICALLY DOWNLOADING AND STORING CONTACT INFORMATION TO A PERSONAL COMMUNICATION DEVICE BASED ON A GEOGRAPHICAL POSITION OF THE PERSONAL COMMUNICATION DEVICE

(76) Inventor: Nitesh Ratnakar, Oak Creek, WI (US)

( * ) Notice: Subject to any disclaimer, the term of this patent is extended or adjusted under 35 U.S.C. 154(b) by 410 days.

This patent is subject to a terminal disclaimer.

(21) Appl. No.: 11/164,318

(22) Filed: Nov. 17, 2005

(65) Prior Publication Data
US 2007/0111711 A1   May 17, 2007

(51) Int. Cl.
H04M 3/42 (2006.01)
H04W 24/00 (2009.01)

(52) U.S. Cl. .................... 455/414.2; 455/456.1
(58) Field of Classification Search .............. 455/414.2, 455/456.1; 701/208; 705/14; 707/2
See application file for complete search history.

(56) References Cited

U.S. PATENT DOCUMENTS

| 5,646,629 | A | * | 7/1997 | Loomis et al. ............... 701/300 |
| 5,930,699 | A | | 7/1999 | Bhatia ..................... 455/456.3 |
| 6,133,853 | A | | 10/2000 | Obradovich |
| 6,148,261 | A | | 11/2000 | Obradovich |
| 6,189,003 | B1 | * | 2/2001 | Leal ........................... 707/2 |
| 6,400,941 | B1 | * | 6/2002 | Nara ....................... 455/422.1 |
| 6,434,381 | B1 | | 8/2002 | Moore et al. ............... 455/114.3 |
| 6,515,595 | B1 | | 2/2003 | Obradovich |
| 6,523,021 | B1 | * | 2/2003 | Monberg et al. .............. 707/2 |
| 6,529,824 | B1 | | 3/2003 | Obradovich |
| 6,565,002 | B1 | | 5/2003 | Kim |
| 6,587,835 | B1 | | 7/2003 | Treyz |
| 6,629,136 | B1 | | 9/2003 | Naidoo ..................... 709/219 |
| 6,707,421 | B1 | | 3/2004 | Drury |
| 6,771,290 | B1 | | 8/2004 | Hoyle |
| 6,812,888 | B2 | | 11/2004 | Drury |
| 6,868,335 | B2 | | 3/2005 | Obradovich |
| 6,898,434 | B2 | | 5/2005 | Pradhan |
| 6,912,407 | B1 | * | 6/2005 | Clarke et al. .............. 455/556.2 |
| 6,924,748 | B2 | | 8/2005 | Obradovich |
| 6,965,868 | B1 | | 11/2005 | Bednarek |
| 7,113,110 | B2 | | 9/2006 | Horstemeyer |
| 7,116,985 | B2 | | 10/2006 | Wilson |
| 7,127,261 | B2 | | 10/2006 | Van Erlach |
| 7,133,834 | B1 | | 11/2006 | Abelow |
| 7,167,553 | B2 | | 1/2007 | Shaffer |
| 7,170,852 | B1 | | 1/2007 | Adler |
| 7,174,301 | B2 | | 2/2007 | Florance |
| 7,181,227 | B2 | | 2/2007 | Wilson |

(Continued)

OTHER PUBLICATIONS

U.S. Appl. No.09/931,896, filed Mar. 21, 2002, Lessard.

(Continued)

Primary Examiner — Ariel Balaoing

(57) ABSTRACT

The present invention relates to a method and system of saving contact information of local businesses into the contact list of a communication device. Contact information is downloaded from a web server into contact list of communication device. Upon input of a search query into communication device, user is able to search contact information of local businesses from within the contact information saved in the communication device without having to rely on communication link with the web server. According to another aspect user is provided means to define geographic restriction criteria relative to current location of communication device for display of contact list in response to search query.

17 Claims, 3 Drawing Sheets

U.S. PATENT DOCUMENTS

| | | | |
|---|---|---|---|
| 7,243,075 B1* | 7/2007 | Shaffer et al. | 705/10 |
| 2002/0052196 A1* | 5/2002 | Padawer et al. | 455/414 |
| 2002/0137525 A1* | 9/2002 | Fleischer et al. | 455/456 |
| 2003/0069690 A1* | 4/2003 | Correia et al. | 701/211 |
| 2003/0220835 A1* | 11/2003 | Barnes, Jr. | 705/14 |
| 2004/0110515 A1* | 6/2004 | Blumberg et al. | 455/456.1 |
| 2004/0192299 A1* | 9/2004 | Wilson et al. | 455/433 |
| 2004/0250212 A1* | 12/2004 | Fish | 715/752 |
| 2005/0001743 A1 | 1/2005 | Haemerle | 340/988 |
| 2005/0080786 A1* | 4/2005 | Fish et al. | 707/10 |
| 2005/0102257 A1* | 5/2005 | Onyon et al. | 707/1 |
| 2006/0046768 A1* | 3/2006 | Kirbas | 455/550.1 |

OTHER PUBLICATIONS

U.S. Appl. No.09/841,268, filed Jan. 31, 2002, Janik.

* cited by examiner

SYSTEM AND METHOD FOR AUTOMATICALLY DOWNLOADING AND STORING CONTACT INFORMATION TO A PERSONAL COMMUNICATION DEVICE BASED ON A GEOGRAPHICAL POSITION OF THE PERSONAL COMMUNICATION DEVICE

FIELD OF INVENTION

The present invention relates to a method and system of entering contact information into the contact lists of communication devices.

BACKGROUND & PRIOR ART

Contact list is a common feature in most modern communication devices; including cellular phones and landline phones. Generally, a caller has to manually enter the phone number and other contact information of friends, acquaintances, businesses and other parties into his cellular phone, landline phone and other communication devices. When a caller wishes to call someone from his contact list, he is required to select the phone number of the said party from his contact list; and then select the automatic dial feature of his communication device to automatically dial the selected number. This has the advantage of not having the caller to remember the phone numbers and other contact information of friends, acquaintances, businesses and other parties; which could otherwise be a challenging task. The automatic dial feature of the contact list enables the caller to dial a phone number from his contact list without having to manually dial the said number. Particularly, this feature of modern phones allows driver to safely make a phone call while driving, as it enables them to make a phone call from their contact list without diverting their attention from driving to manually dial a phone number.

However, present phones have significant limitations with respect to the features, functionality and management of their contact list; 1) it requires manual entry of contact information into the contact list; 2) it allows retrieval of contact information of only those parties whose contact information have been added to the contact list. When a caller has to call a party that is not listed in the contact list of his phone, he has to look up the contact information of the said party at other places like the yellow book, directory assistance, Internet or other relevant sources. Once the said contact information is found, it has to be manually entered into the phone and saved in the contact list. This a cumbersome and time consuming process. It is also not possible to find the contact information of parties at all times, simply because the resources needed to find such information is not always readily available; for example while driving.

Some modern phones, especially cellular phones, are web enabled and allow for surfing the Internet. An example of such service is the wireless 'Google', which allows callers to browse the Internet on their cellular phone. This feature enables callers to find contact information of a party from available resources on the Internet, like www.yellowpages.com. However, this system too, has limitations and drawbacks; 1) it requires manual entry of the desired party's information, including general location, into the web browser of the cellular phone; 2) it does not enable the caller to automatically save the contact information obtained from the search result into the contact list of his phone; 3) it does not enable the caller to automatically dial the phone number displayed by the search result; 4) requires a new search for each individual party; and 5) requires the caller to regularly subscribe to internet service, which can be quite expensive.

It is a known fact that most contact information search is done to find phone numbers and contact information of local businesses. It is also a known fact that individuals do majority of their commerce with local businesses, usually within a 50 mile radius of their residence or place of work. However, there is no method, system or solution in the prior art that enables callers to download and save contact information of local businesses into the contact list of their communication device, without requiring them to manually enter the contact information of each individual local business individually. This is a cumbersome and time consuming process, and is unfeasible if a caller wishes to have contact information of all local businesses saved in his communication device.

SUMMARY OF THE INVENTION

The present invention is directed to a system and method that overcomes the aforementioned drawbacks. In one embodiment, the present invention provides a system and method to: 1) enable callers to download and save phone numbers and contact information of local businesses into their communication device, such as cellular phone, without needing to manually enter the said phone numbers and contact information; 2) enable callers to dial a number from the contact list of the communication device using its automatic dial feature; and 3) enable callers to search contact information of local businesses from the comprehensive contact information database of local businesses saved in the contact list of their communication device, without having the need to re-access an outside contact information database.

Therefore, according to one aspect, means is provided for callers to download the contact information of local businesses from a 'central contact information database' saved on a remote server into the contact list of their communication device, without having the need to manually enter the said contact information. The 'central contact information database' contains contact information of local businesses in one or more geographical areas. According to another aspect, callers are provided means to utilize the auto dial feature of the communication device to automatically dial a selected phone number from their contact list. According to another aspect, callers are provided with means to automatically transfer contact information from the contact list of communication device to the contact list of another communication device. The present invention will improve commerce between local residents and local businesses by making contact information, including phone numbers, of local businesses readily available to local consumers on their personal communication device; without ever requiring them to manually enter each of the said contact information individually into the personal communication device. It enables callers to automatically save contact information of a large number of local businesses in their personal communication device; without the need to manually enter such contact information, which is cumbersome and often unfeasible; especially when the contact information data is large.

Means are provided for businesses to enter their contact information into a 'central contact information database'; which is saved on a central server. Means are provided for callers to download and save the contact information of local businesses from the 'central contact information database' into their communication device, such as cellular phone. This feature enables callers to save contact information of local businesses in their communication device without needing to enter the said contact information manually. Once saved, callers can access and search the contact information database saved in their communication device to find contact information of local businesses. The present invention enables callers to readily find contact information of local businesses from within their communication device at all times; without requiring them to access any outside source. Means are also provided for callers to automatically dial a phone number from the contact information database in their communication device.

In this respect, before explaining at least one embodiment of the invention in detail, it is understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out one or several purposes of the present invention.

DETAILED DESCRIPTION OF THE INVENTION

Figure 1:
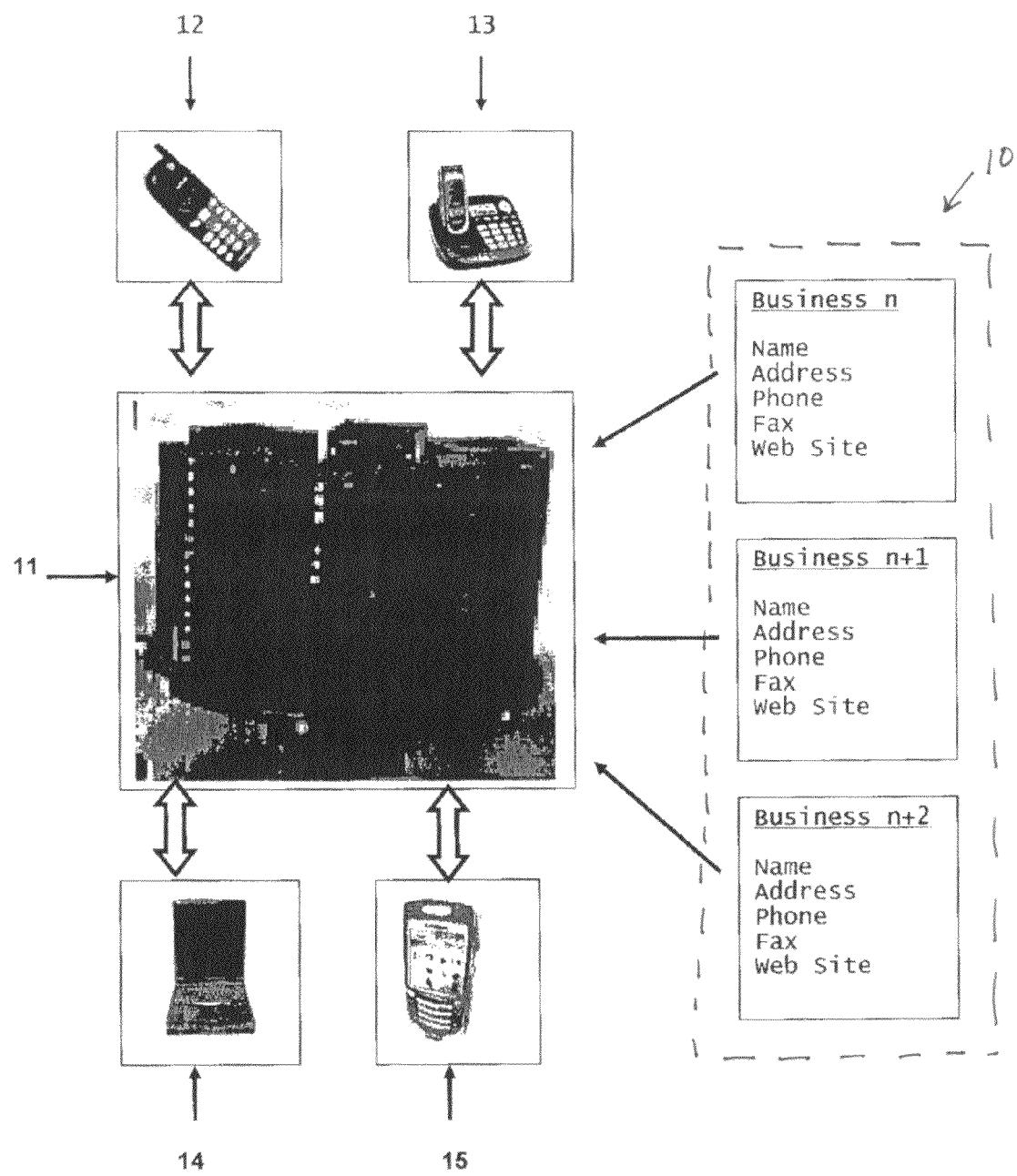
FIG. 1 shows a central server with the 'central contact information database' and an overview of; 1) the process of entry of contact information data into the 'central contact information database'; and 2) the process of transfer of information between the central server and various communication devices.

According to one aspect of the invention, a 'central contact information database' of all businesses is created. In the preferred method, this is done in a web-based environment. A web portal (10) is provided for businesses to enter their contact information into the 'central contact information database' as shown in FIG. 1. The 'central contact information database' is stored on a remote device, preferably a Central Server (11) as shown in FIG. 1. Alternatively, contact information of businesses can be imported into the 'central contact information database' from an existing contact information database. One example of such a source of is the 'Yellow Pages', which is published both in print form and online at www.yellowpages.com. Contact information of a business in the 'central contact information database' comprises business name, phone number, fax number, street address and web address. Additional information may include business hours, driving directions and any other pertinent information relating to the said business. The 'central contact information database' can be created using one of many available database programs like My SQL, MSSQL, MS Access and the like. Means are provided in the 'central contact information database' to sort the contact information stored therein, according to various variables such as city, postal code, location, state, type or category of business, name of business, hours of operation, etc.

Figure 2:
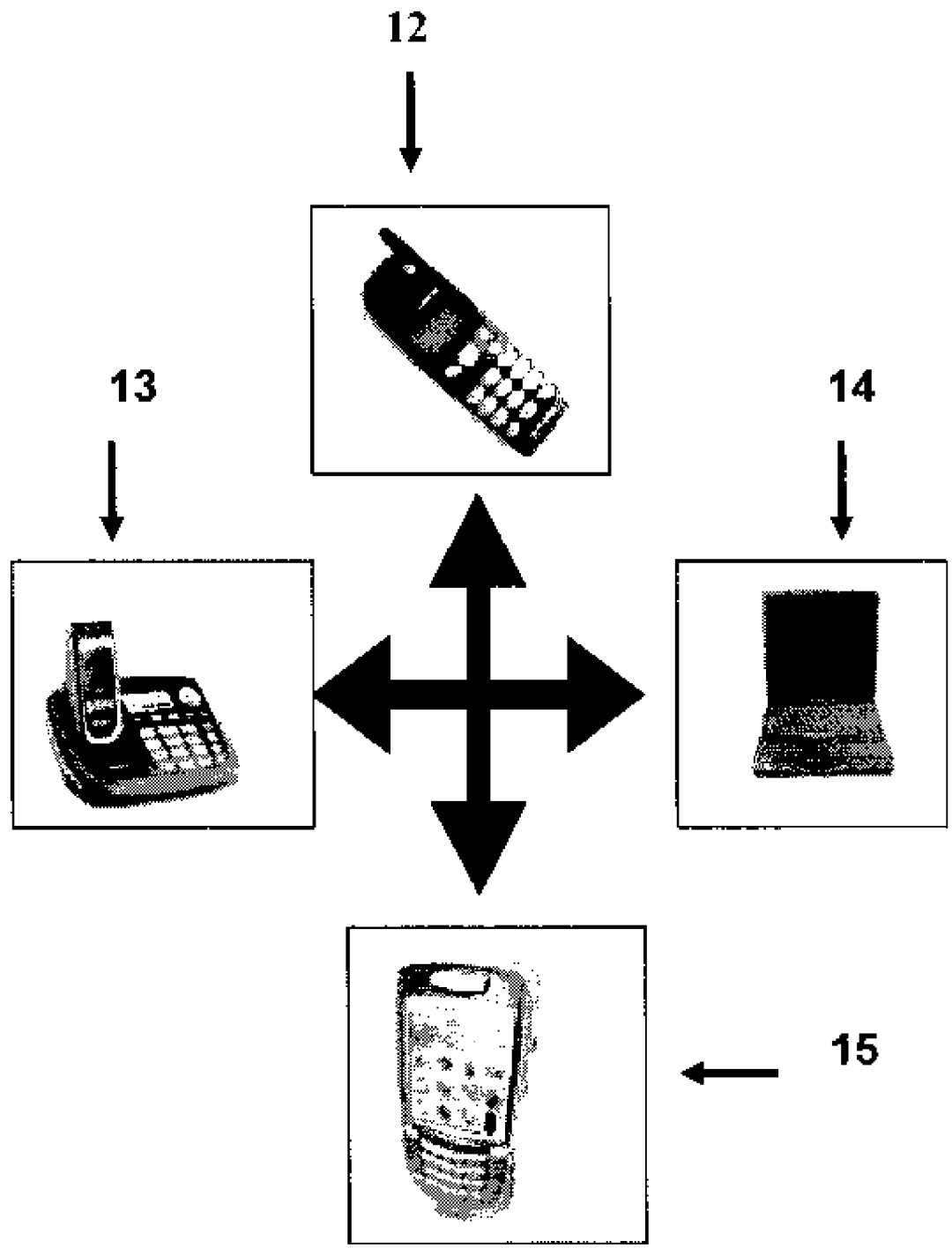
FIG. 2 shows an overview of the process of transfer of contact information database between various communication devices.
Figure 3:
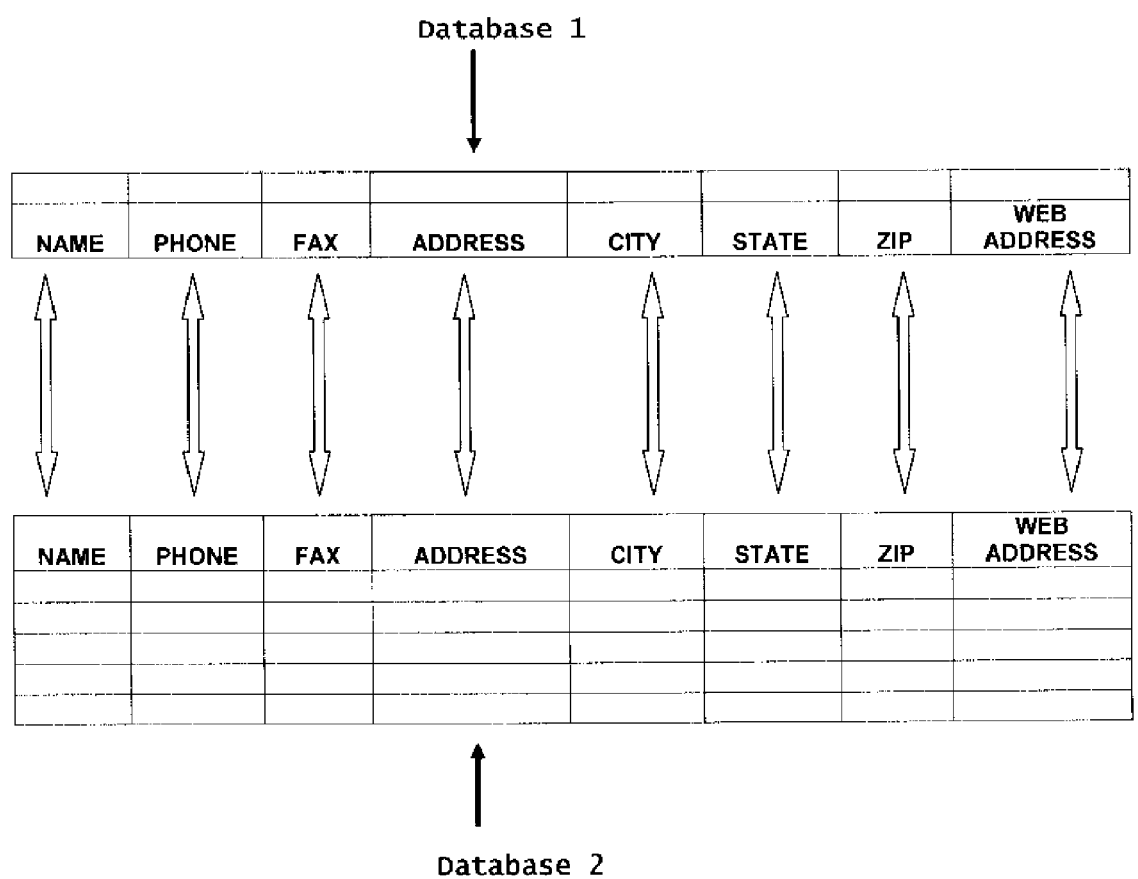
FIG. 3 shows an overview of synchronization, import and export of contact information database by means of database integration between the 'central contact information database' of the central server and the contact list of various communication devices; and among the contact list of various communication devices.

According to another aspect of the invention, means are provided to download contact information of local businesses from the 'central contact information database' on the remote server into the phone list of communication devices such as cellular phone (12), landline phone (13), personal computer (14) or PDA (15); without having the need to manually enter the contact information of each local business individually into a communication device; as is required at the present time. This is shown in FIG. 1. In the preferred method, means is provided to callers to customize the contact information they want to download. For example, a caller may want to download contact information of all businesses within a 10 mile radius of a certain zip code or he may want to download contact information of all businesses in the category of 'Fast Food Restaurants' within a 50 mile radius of a certain zip code; and the like. The method to download data from the 'central contact information database' into a communication device depends on the nature of the said communication device. 1) Cellular phone: Contact information database of local businesses is downloaded wirelessly from the central server over a carrier's network into the contact list of the cellular phone (12). The downloaded database is stored in the memory chip of the cellular phone (12). The size of the said memory chip is large enough to store the selected contact information database. According to another method, means is provided, both hardware and software, for the said cellular phone (12) to connect and communicate with an Internet enabled personal computer (14) e.g. via a USB port. Means are provided to download contact information database of local businesses from the central server into the contact list (example MS Outlook) of the personal computer (14); and thereafter export the said contact information database to the contact list of cellular phone (12); as shown in FIGS. 2&3. According to yet another method, the contact information database of local businesses is first downloaded from the central server into the contact list of a landline phone (13); wherein the said landline phone (13) is enabled to receive and process both data and voice. Thereafter, the contact information database is exported to the contact list of the cellular phone (12). Means are provided for the landline phone (13) to connect and communicate with the cellular phone (12); as shown in FIGS. 2&3; 2) Landline phone: In this situation, landline phones (13) are Internet enabled, with means to receive and process both voice and data. According to one method, contact information database of local businesses is downloaded from the central server into the contact list of the said landline phone (13). According to another method, contact information database of local businesses is downloaded from the central server into the contact list of an Internet enabled personal computer (14), and thereafter exported to the contact list of the said landline phone (13). Means, both hardware and software, are provided to enable the landline phone (13) to connect and communicate with the personal computer (14); as shown in FIGS. 2&3. According to yet another method, contact information database of local businesses is downloaded from the central server into the contact list of cellular phone (12); and thereafter exported to the contact list of the landline phone (13). Means, both hardware and software, is provided for the said landline phone (13) to connect and communicate with the cellular phone (12); as shown in FIGS. 2&3; 3) Personal computer or PDA: According to one method, contact information database of local businesses is downloaded from the central server into the contact list (example MS Outlook) of the said personal computer (14) or PDA (15) via the Internet. According to another method, contact information database of local businesses is downloaded from the central server into the contact list of landline phone (13) or cellular phone (12). Means, both hardware and software, is provided for the said personal computer (14)/PDA (15) to connect and communicate with cellular phone (12) and landline phone (13), as shown in FIGS. 2&3; which enables personal computer (14) and PDA (15) to import contact information database from the contact list of the landline (13) or cellular phone (12).

Hardware system to synchronize, export or import contact information database from one communication device to another is shown in FIG. 2. The communication devices can be connected to each other via a wired connection or via a wireless network. The software system to synchronize contact information database between different communication devices; and between the central server and communication devices is shown in FIG. 3; and uses database integration methodology commonly used in many existing applications. The said database integration software system synchronizes, imports or exports data from a selected data field of a one database (database 1) to a selected corresponding data field of another database (database 2); as shown in FIG. 3. In the preferred method, the contact information database structure is similar in the central server and in various communication devices, which allows for easy integration and transfer of data between the central server and communication devices and between various communication devices. Means is provided, in the form of appropriate software, to enable landline phone (13), cellular phone (12), personal computer (14) and PDA (15) to process and execute meaningful applications from the contact list saved therein; like auto dial selected phone numbers from the said contact list.

According to one aspect of the present invention, contact information database of local businesses in a given area is downloaded from the 'central contact information database' into communication devices such as cellular phone (12), landline phone (13), personal computer (14) or PDA (15) of one or more local callers. Callers are provided means to download the contact information database of 1) all local businesses; 2) all local businesses in a particular business category; or 3) one or more selected local businesses; into the contact list of their communication device. Once downloaded and saved into a communication device, the said contact information database is searchable by business name, business category or any other sub category. Accordingly, when a caller has to call a local business, he searches for the said business's contact information in the contact list of his communication device; and thereafter dials the said phone number; without needing to search for the said contact information elsewhere; and without having the need to ever enter the said contact information manually into his communication device. Once the contact information database is downloaded and saved into a communication device, the contact information contained therein can be searched and accessed from within the said communication device without having the need to re access the 'central contact information database' in the central server or any other external source. According to another aspect, when a caller travels to a different location, he is provided the means to download the contact information database of local businesses in the caller's new location. For example, when a caller travels from Chicago, Ill. to New York, N.Y., he has the means to download the contact information database of local businesses in New York, N.Y. into his communication device.

According to yet another aspect of the present invention, the contact information database of local businesses is automatically downloaded into the communication device of a caller; based on automatic determination of the location of the said communication device. The location of the communication device can be automatically determined using one of many available methods, like Global Positioning System (GPS), originating cellular tower location, location of the landline phone, internet protocol (IP) address and the like. This aspect of the present invention gives the caller means to download the contact information database of local businesses into his communication device, without having the need to enter information about his location. This feature is particularly useful for callers who travel frequently. For example, a caller driving from Chicago, Ill. to New York, N.Y. wants to go to the nearest Wal-Mart store while driving through Cleveland, Ohio. The contact information database of local businesses in Cleveland, Ohio is automatically downloaded into his cellular phone or any other communication device when he enters Cleveland, Ohio. When the said caller searches for 'Wal-Mart' in the contact list in his cellular phone, the contact information of Wal-Mart stores in Cleveland, Ohio is displayed.

In the preferred methods of the present invention, the contact information database of local businesses is downloaded and saved in a communication device. However, according to another method of the present invention, the contact information database of local businesses is stored in a remote central server and accessed remotely by various communication devices. According to this method, a caller dials a pre-determined number from his communication device and enters the location, name or category of the business for which he would like to obtain the contact information. Alternatively, the location of the caller is determined automatically by determining the location of his communication device using one of many available systems like global positioning system (GPS), originating cellular tower location, location of the landline phone, internet protocol (IP) address and the like. Once the central server with the 'central contact information database' receives the said information, the contact information of the selected business is transmitted to the caller's communication device, where the said contact information is displayed. In the preferred method, the said communication device is enabled to automatically dial the phone number from the displayed contact information using the auto dial feature. In addition, means are provided for the said communication device to save the displayed phone number and contact information into its contact list. According to yet another method of the present invention; the entire 'central contact information database' can be downloaded from the central server into a communication device, whereafter contact information of local businesses in the area of the location of a communication device can be searched from within the contact list of the communication device. In this method, the location of the communication device is again determined by either 1) manually entering the location into the said device; or 2) by automatic determination of the location of the said communication device using one of many available systems like global positioning system (GPS), originating cellular tower location, location of the landline phone, internet protocol (IP) address and the like.

The invention is capable of other embodiments and of being practiced and carried out in various ways. As such, those skilled in the art will appreciate that the conception, upon which this disclosure is based, may readily be utilized as a basis for the designing of other structures, methods and systems for carrying out one or several purposes of the present invention. Some variations of the present inventions are; 1) in discussion of the present invention, contact information of local businesses is illustrated. However, this should not be considered limiting as contact information of businesses in any geographic area can be used similarly; 2) in discussion of the present invention, contact information of businesses if discussed, however contact information of other parties, outside of the category of 'business', can be used similarly. The list is by no means exhaustive. It is important, therefore, that the claims be regarded as including such equivalent constructions insofar as they do not depart from the spirit and scope of the present invention.

What is claimed is:

1. A method comprising:
   downloading data from a remote server to create a central contact database in a communication device, wherein the central contact database includes contact information for a plurality of entities, the plurality of entities associated with multiple geographical locations;
   determining a current geographical location of the communication device by using a communication device having location determining module;
   receiving a user input identifying a desired physical geographical area relative to a current location of the communication device, wherein the physical geographical area includes a limitation of distance;
   determining a current geographical region containing the geographical location of the communication device and limited in expanse by the physical geographical area;
   downloading to the communication device a first plurality of contact list entries based on a first geographical location of the communication device with contact information corresponding to the first location of the communication device;
   downloading to the communication device a second plurality of contact list entries based on a second geographical location of the communication device with second contact information corresponding to the second location of the communication device, wherein the second plurality of contact list entries is not identical to the first plurality of contact list entries; and
   inputting from a communication device user a first user search query input and a first geographic boundary limit relative to the first location of the communication device; and
   generating a first search result list for displaying on the communication device, wherein the first search result list includes only data that is a portion of the downloadable data associated with the first geographical location.

2. The method of claim 1 wherein downloading data includes forming a communication link between the communication device and the remote server having a centralized database, the centralized database having data fields substantially similar to data fields of the database contained on the communication device, and transmitting the contact information from centralized database to the database contained on the communication device.

3. The method of claim 2 wherein the centralized database is a third-party database.

4. The method of claim 2 further comprising permitting a plurality of contacts to enter contact information into the centralized database wherein the contacts desire to make their contact information available for downloading to the communication device.

5. The method of claim 2 wherein determining the geographical location of the communication device includes receiving an input from the user of the communication device identifying a postal code associated with the geographical location of the communication device and wherein generating the contact list includes determining contacts having contact information associated with the postal code contained in the input.

6. The method of claim 2 wherein the search criteria includes a user-identified category of interest.

7. The method of claim 1 wherein the communication device has telephony components that include circuitry that supports quick-dialing functionality and a dialing pad.

8. The method of claim 7 wherein the contact information includes phone numbers and wherein the contact information is stored in memory of the communication device in such a manner that allows an operator to use the quick-dialing functionality of the communication device to dial a phone number of a given contact without requiring the operator to manually input the phone number into the dialing pad of the communication device.

9. The method of claim 1 wherein the contacts are businesses offering services in the geographical region.

10. The method of claim 9 further comprising determining a list of frequently contacted contacts and automatically downloading contact information for similarly-named contacts when the communication device moves to a new geographical location.

11. The method of claim 1 wherein the geographical location of the communication device is determined using one of GPS, nearest cellular tower location, landline location, internet protocol address, or nearest wireless access point.

12. A system to provide location-based contact information to a communication device, the system comprising:
    a remote database containing downloadable data including contact information for a plurality of contacts associated with a plurality of geographical locations;
    a communication device having a location determining module for determining a current geographical location of the communication device, the communication device having an internal memory sized to store the contact information for a number of contacts;
    a communications network that facilitates downloading information representative of contacts, and associated contact information, from the remote database to a local database contained in the internal memory of the communication device;
    wherein the communication device will download a first plurality of contact list entries based on a first geographical location of the communication device with contact information corresponding to the first location of the communication device, wherein the communication device will selectively download a second plurality of contact list entries based on a second geographical location of the communication device with second contact information corresponding to the second location of the communication device, wherein the second plurality of contact list entries is not identical to the first plurality of contact list entries; and
    wherein the communication device will selectively receive from a communication device user a first user search query input and a first geographic boundary limit relative to the first location of the communication device and generate a first search result list for displaying on the communication device, wherein the first search result list includes only data that is a portion of the downloadable data associated with the first geographical location.

13. The system of claim 12 further comprising a portal linked to the remote database and configured to allow a contact to add their contact information to the remote database.

14. The system of claim 12 wherein the communication device is one of a cellular (mobile) phone, a PDA, a computer, and a landline telephone.

15. The system of claim 12 wherein the contacts are businesses and the contact information includes one of name, address, telephone number, hours of operation, directions, and business category.

16. A system to provide location-based contact information to a communication device, the system comprising:
- a remote database containing downloadable data including contact information for a plurality of contacts associated with a plurality of geographical locations;
- a communication device having a location determining module for determining a current geographical location of the communication device, the communication device having an internal memory sized to store the contact information for a number of contacts;
- a communications network that facilitates downloading information representative of contacts, and associated contact information, from the remote database to a local database contained in the internal memory of the communication device;
- wherein the communication device will download a first plurality of contact list entries based on a first geographical location of the communication device with contact information corresponding to the first location of the communication device, wherein the communication device will selectively download a second plurality of contact list entries based on a second geographical location of the communication device with second contact information corresponding to the second location of the communication device, wherein the second plurality of contact list entries is not identical to the first plurality of contact list entries; and
- wherein the communication device will selectively receive from a communication device user a first user search query input and a first geographic boundary limit relative to the first location of the communication device and generate a first search result list for displaying on the communication device, wherein the first search result list includes only data that is a portion of the downloadable data associated with the first geographical location.

17. The method of claim 1 wherein the contact information includes business hours and a web address.

* * * * *